(12) United States Patent
Mangtani et al.

(10) Patent No.: US 7,834,603 B2
(45) Date of Patent: Nov. 16, 2010

(54) CIRCUIT COMBINING A SWITCHING REGULATOR AND AN OVERVOLTAGE DETECTION CIRCUIT

(75) Inventors: Vijay Mangtani, Nashua, NH (US); Weiyun Chen, Gilbert, AZ (US); Ravi Vig, Bow, NH (US)

(73) Assignee: Allegro Microsystems, Inc., Worcester, MA (US)

( * ) Notice: Subject to any disclaimer, the term of this patent is extended or adjusted under 35 U.S.C. 154(b) by 230 days.

(21) Appl. No.: 12/124,752

(22) Filed: May 21, 2008

(65) Prior Publication Data

US 2009/0289611 A1 Nov. 26, 2009

(51) Int. Cl.
G05F 1/10 (2006.01)
G05F 1/656 (2006.01)
G05F 1/652 (2006.01)

(52) U.S. Cl. .................. 323/282; 323/284; 323/285; 323/286; 323/222; 323/224

(58) Field of Classification Search ................. 323/282, 323/284, 285, 286, 222, 224
See application file for complete search history.

(56) References Cited

U.S. PATENT DOCUMENTS

| | | | |
|---|---|---|---|
| 5,481,178 A | 1/1996 | Wilcox et al. | |
| 5,731,694 A | 3/1998 | Wilcox et al. | |
| 5,994,885 A | 11/1999 | Wilcox et al. | |
| 6,100,678 A | 8/2000 | Hobrecht | |
| 6,144,194 A | 11/2000 | Varga | |
| 6,166,527 A * | 12/2000 | Dwelley et al. | 323/222 |
| 6,208,279 B1 | 3/2001 | Oprescu | |
| 6,304,066 B1 | 10/2001 | Wilcox et al. | |
| 6,307,356 B1 | 10/2001 | Dwelley | |
| 6,518,733 B1 | 2/2003 | Schenkel et al. | |
| 6,580,258 B2 | 6/2003 | Wilcox et al. | |
| 6,674,274 B2 | 1/2004 | Hobrecht et al. | |
| 6,873,191 B2 * | 3/2005 | Dequina et al. | 327/110 |
| 7,254,000 B1 * | 8/2007 | Smith et al. | 361/56 |
| 7,495,419 B1 * | 2/2009 | Ju | 323/259 |
| 2003/0112568 A1 * | 6/2003 | Holt et al. | 361/91.1 |
| 2008/0030178 A1 | 2/2008 | Leonard et al. | |
| 2008/0238382 A1 * | 10/2008 | Wei et al. | 323/271 |

OTHER PUBLICATIONS

Linear Technology (summary); "LT3685 36V, 2A, 2.4MHz Step-Down Switching Regulator;" inet: http://www.linear.com/pc/productDetail.jsp?navId=H0,C1,C1003C,C1042,C1032,C1082.P38111; 4 pages.
Linear Technology; "LT3685 36V, 2A, 2.4MHz Step-Down Switching Regulator;" inet: http://www.linear.com/pc/downloadDocument.do?navId=H0,C1,C1003,C1042,C1032,C1082,P38111,D25169; 24 pages.

* cited by examiner

*Primary Examiner*—Bao Q Vu
(74) *Attorney, Agent, or Firm*—Daly, Crowley, Mofford & Durkee, LLP

(57) ABSTRACT

An electronic circuit combines a synchronous switching regulator circuit with an overvoltage detection circuit. The overvoltage detection circuit is configured to generate an overvoltage signal capable of an overvoltage state indicative of a power supply voltage being above a predetermined threshold voltage. The switching regulator circuit is coupled to receive the overvoltage signal. The switching regulator is also configured, in response to the overvoltage signal being in the overvoltage state, to generate a first control signal resulting in at least one of two series coupled transistors being in an off condition.

20 Claims, 2 Drawing Sheets

CIRCUIT COMBINING A SWITCHING REGULATOR AND AN OVERVOLTAGE DETECTION CIRCUIT

CROSS REFERENCE TO RELATED APPLICATIONS

Not Applicable.

STATEMENT REGARDING FEDERALLY SPONSORED RESEARCH

Not Applicable.

FIELD OF THE INVENTION

This invention relates generally to integrated circuits and, more particularly, to a circuit that combines a switching regulator and an overvoltage circuit.

BACKGROUND OF THE INVENTION

A variety of types of switching regulators are known. Each type of switching regulator achieves a regulated output voltage, which is lower than an input voltage in some circuit arrangements, nearly the same as the input voltage in some other circuit arrangements, and which is higher than the input voltage in some other circuit arrangements.

A so-called buck converter achieves a regulated output voltage, which is lower than an input voltage. One conventional form of buck converter uses one transistor switch in combination with one diode to provide a rectified signal to an inductor and capacitor. Another conventional form of buck converter, sometimes referred to a synchronous buck converter, uses two series connected transistor switches operating generally in opposition, wherein one switch is closed when the other is open and vice versa in order to provide the rectified signal.

A so-called buck-boost converter achieves a regulated output voltage, which is nearly the same as the input voltage. A conventional form of buck-boost converter, sometimes referred to a synchronous buck-boost converter, like the synchronous buck converter, also uses two series connected transistor switches, a first pair of switches, operating generally in opposition, wherein one switch is closed when the other is open and vice versa. The synchronous buck-boost converter also includes a second pair of two series connected switches.

In some applications, in particular automotive applications, the synchronous buck converter and the synchronous buck-boost converter must be designed to withstand a large overvoltage at their input. In automotive applications, this overvoltage may be largest upon a so-called "load dump." A load dump will be understood to be a condition that occurs at a time when an automobile engine is running, therefore an associated alternator is generating electricity in-part to charge an automobile battery coupled to the automobile power system, and the battery is suddenly disconnected. While the automobile battery is nominally a twelve volt battery, at the time of a load dump, the voltage experience by electronics connected to the automobile power system can be in excess of sixty volts.

It is known that, in order to achieve electronic components, for example, transistors, which are capable of withstanding higher voltages, the electronic components can be made larger. However, it is also known that larger electronic components are generally undesirable.

In the case of power transistors, as may be used as the series connected transistors in the above-described synchronous switching regulators, larger transistors use a larger amount of silicon area in an integrated circuit. Larger silicon area tends to result in lower integrated circuit yield during manufacture, a lower quantity of integrated circuits available on a silicon wafer during manufacture, and therefore, a higher integrated circuit cost.

SUMMARY OF THE INVENTION

The present invention provides synchronous switching regulator circuits for which at least one of two series-connected power transistors is protected from an overvoltage condition. Therefore, the switching regulator circuit can be made smaller than would otherwise be required.

In accordance with one aspect of the present invention, an electronic circuit includes a switching regulator circuit. The switching regulator circuit includes a first transistor having an input node, an output node, and a control node. The input node of the first transistor is coupled to receive a power supply voltage. The switching regulator circuit also includes a second transistor having an input node, an output node, and a control node. The input node of the second transistor is coupled to the output node of the first transistor, and the output node of the second transistor is coupled to receive a reference voltage. The switching regulator circuit also includes a control circuit having a first output node at which a first control signal is provided and a second output node at which a second control signal is provided. The first output node of the control circuit is coupled to the control node of the first transistor, and the second output node of the control circuit is coupled to the control node of the second transistor. The electronic circuit also includes an overvoltage detection circuit having an input node coupled to receive the power supply voltage and an output node at which an overvoltage signal is provided capable of an overvoltage state indicative of the power supply voltage being above a predetermined threshold voltage. The control circuit is coupled to receive the overvoltage signal. The control circuit is configured, in response to the overvoltage signal being in the overvoltage state, to generate the first control signal resulting in the first transistor being in an off condition.

In accordance with another aspect of the present invention is a method of controlling a switching regulator circuit. The switching regulator circuit includes a first transistor having an input node, an output node, and a control node. The input node of the first transistor is coupled to receive a power supply voltage. The switching regulator circuit further includes a second transistor having an input node, an output node, and a control node. The input node of the second transistor is coupled to the output node of the first transistor, and the output node of the second transistor is coupled to receive a reference voltage. The switching regulator circuit further includes a control circuit having a first output node at which a first control signal is provided and a second output node at which a second control signal is provided. The first output node of the control circuit is coupled to the control node of the first transistor and the second output node of the control circuit is coupled to the control node of the second transistor. The method further includes detecting if the power supply voltage is above a predetermined threshold voltage, and, in response to the detecting, turning off the first transistor.

BRIEF DESCRIPTION OF THE DRAWINGS

The foregoing features of the invention, as well as the invention itself may be more fully understood from the following detailed description of the drawings, in which.

DETAILED DESCRIPTION OF THE INVENTION

Figure 1:
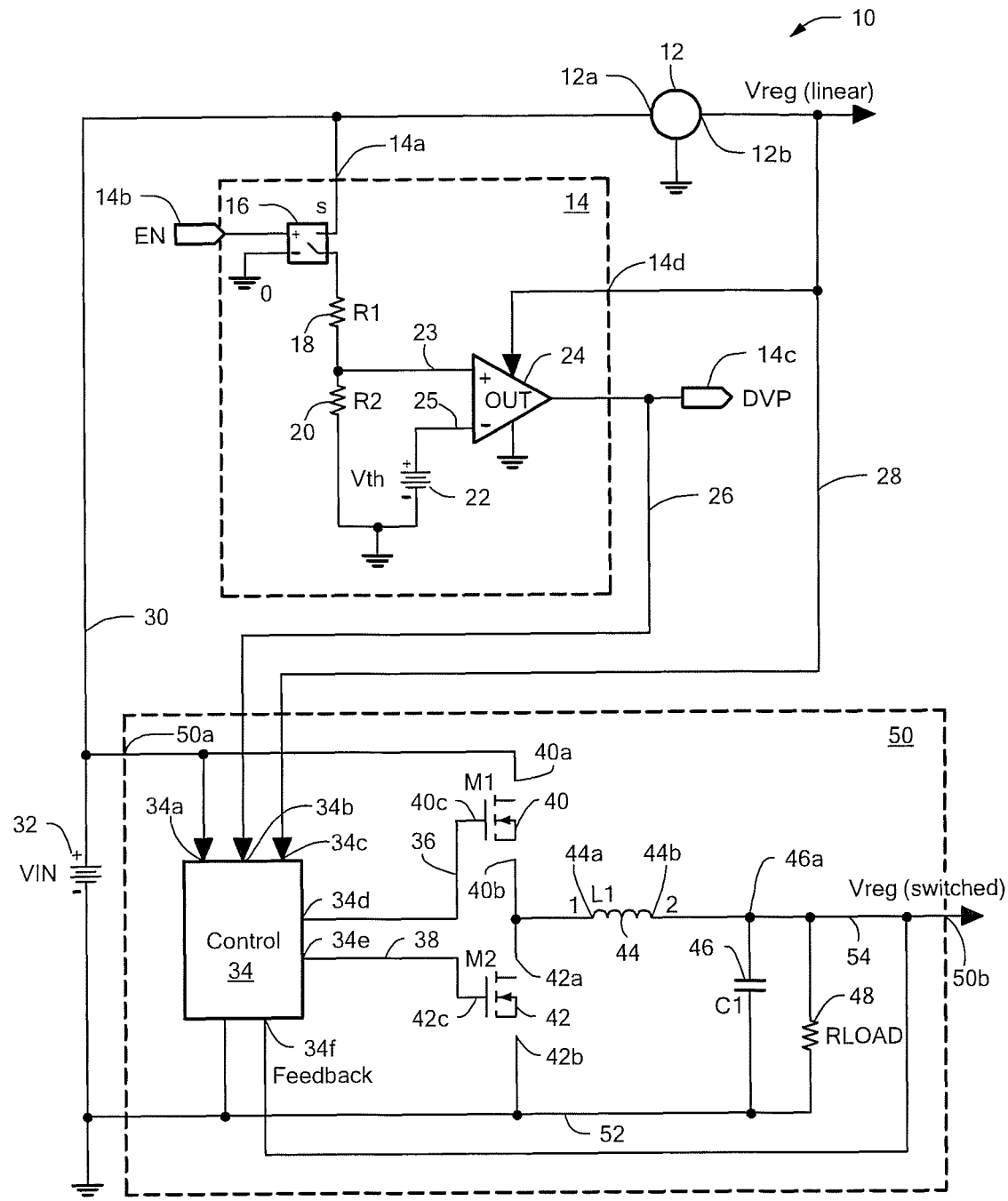
FIG. 1 is block diagram showing an exemplary circuit that combines a buck switching regulator circuit and an overvoltage detection circuit.

Referring to FIG. 1, an exemplary electronic circuit 10 includes a switching regulator circuit 50, here shown to be a synchronous buck switching regulator circuit, coupled to receive a power supply voltage 30 at a node 50a. The switching regulator circuit 50 includes a first transistor 40 having an input node 40a, an output node 40b, and a control node 40c. The input node 40a of the first transistor 40 is coupled to receive the power supply voltage 30 from a power supply 32. The switching regulator circuit 50 also includes a second transistor 42 having an input node 42a, an output node 42b, and a control node 42c. The input node 42a of the second transistor 42 is coupled to the output node 40b of the first transistor 40. The output node 42b of the second transistor 42 is coupled to receive a reference voltage 52. In some embodiments, the reference voltage 52 is zero volts, e.g., ground. The switching regulator circuit 50 also includes a control circuit 34 having a power supply input node 34a coupled to receive the power supply voltage 30, a first output node 34d at which a first control signal 36 is provided, and a second output node 34e at which a second control signal 38 is provided. The first output node 34d of the control circuit 34 is coupled to the control node 40c of the first transistor 40. The second output node 34e of the control circuit 34 is coupled to the control node 42c of the second transistor 42.

In some embodiments, the switching regulator circuit 50 also includes an inductor 44 having first and second nodes 44a, 44b, respectively. The first node 44a of the inductor 44 is coupled to the output node 40b of the first transistor 40 and to the input node 42a of the second transistor 42. In some embodiments, the switching regulator circuit 50 also includes a capacitor 46 coupled to the second node 44b of the inductor 44. In some embodiments, the control circuit 34 further includes a feedback node 34f coupled to the second node 44b of the inductor 44. A regulated voltage 54 (switched-regulated voltage) is provided at the second node 44b of the inductor 44 and at an output node 50b of the switching regulator 50.

The electronic circuit 10 also includes an overvoltage detection circuit 14 having an input node 14a configured to receive the power supply voltage 30 and an output node 14c at which an overvoltage signal 26 is provided capable of an overvoltage state indicative of the power supply voltage 30 being above a predetermined threshold voltage 25. The control circuit 34 is configured to receive the overvoltage signal 26 at a node 34b. The control circuit 34 is also configured, in response to the overvoltage signal 26 being in the overvoltage state, to generate the first control signal 36 resulting in the first transistor 40 being in an off condition. When the first transistor 40 is turned off, the switching regulator 50 is essentially shut off, and the regulated output voltage 54 of the switching regulator 50 begins to droop, for example, toward zero volts.

In some embodiments, the control circuit 34 is configured, in response to the overvoltage signal 26 being in the overvoltage state, to generate the first and second control signals 36, 38, respectively, resulting in the first and second transistors 40, 42, respectively, both being in an off condition at the same time. However, in some other embodiments, the control circuit 34 is configured, in response to the overvoltage signal 26 being in the overvoltage state, to generate the first and second control signals 36, 38, respectively, resulting in the first transistor 40 being in an off condition and, at the same time, the second transistor 42 being in an on condition.

In some embodiments, the first and second transistors 40, 42, respectively, are field effect transistors, for example, N-channel FETs. In other embodiments, the first and second transistors 40, 42, respectively, are bipolar transistors, for example, NPN transistors. However, the first transistor 40 or the second transistor 42 can also be a P-channel FET or a PNP bipolar transistor.

In some embodiments, the control circuit 34 is configured, in response to the overvoltage signal 26 not being in the overvoltage state, to generate the first and second control signals 36, 38, respectively, as respective complimentary periodic signals resulting in the first and second transistors 40, 42, respectively, being in respective complimentary periodic on and off conditions. However, in other embodiments, the control circuit 34 is configured, in response to the overvoltage signal 26 not being in the overvoltage state, to generate, during first periodic time periods, the first and second control signals 36, 38, respectively, as respective complimentary signals resulting in the first and second transistors 40, 42, respectively, being in respective complimentary on and off conditions, and to generate, during second periodic time periods, the first and second control signals 36, 38, respectively, resulting in at least one of the first or second transistors 40, 42, respectively, being in the off condition.

In some embodiments, the overvoltage detection circuit 14 includes a comparator 24 coupled to receive a signal 23 representative of the power supply voltage 30 and also coupled to receive the predetermined threshold voltage 25. The predetermined threshold voltage 25 can be generated by a voltage source 22, for example, a band gap voltage source. The signal 23 representative of the power supply voltage 30 can be generated, for example, by a resistor divider formed by two resistors 18, 20 coupled to receive the power supply voltage 30.

In some embodiments, the overvoltage detection circuit 14 further includes an enable input node 14b coupled to receive an enable signal, for example, from another circuit (not shown). In operation, the overvoltage detection circuit 14 can be configured to generate the overvoltage signal 26 not in the overvoltage state in response to a state of the enable signal. In order to achieve this operation, the enable node 14b can be coupled to a switch 16 as shown.

In some embodiments, the electronic circuit 10 also includes a voltage regulator circuit 12 having an input node 12a coupled to receive the power supply voltage 30. The voltage regulator 12 is configured to generate a regulated voltage 28 at an output node 12b regardless of any state of the overvoltage signal 26. In some embodiments, the voltage regulator 12 is a linear voltage regulator. In some embodiments, the control circuit 34 includes a power input node 34c coupled to receive the regulated voltage 28. In some embodiments, the overvoltage detection circuit 14 further includes a power input node 14d configured to receive the regulated voltage 28. With these arrangements, one of or both of the comparator 24 or the control circuit 34 can remain powered on when the first transistor 40 is turned off, which, as described above, essentially shuts down the output portions of the switching regulator 50. Since the overvoltage comparator 24 can retain power, it is possible to maintain operation of the overvoltage detection circuit 14 when the first transistor 40 is off. Since the control circuit 34 can retain power, it is possible to resume operation of the first switch 40 rapidly when the overvoltage condition is removed.

In some embodiments, since the control circuit 34 can retain power, it is also possible for the control circuit 34 to count all overvoltage events.

In operation, the overvoltage circuit 14 detects an overvoltage of the power supply voltage 30 and changes state of the overvoltage signal 26 accordingly. As described above, in response to the overvoltage signal 26 achieving the overvoltage state, at least the first transistor 40 is turned off by the control circuit. It will be understood that when the first transistor 40 is turned off, the second transistor 42 does not experience the overvoltage of the power supply voltage 30. Therefore, the second transistor can be designed to survive a voltage less than the expected overvoltage of the power supply voltage.

In some embodiments, the power supply 32 is nominally about eight to sixteen volts, the power supply voltage 30 is nominally about eight to sixteen volts accordingly, and the power supply voltage 30 has an overvoltage in the range of thirty to fifty volts. However the circuit 10 can be designed for other power supply voltages and other overvoltage ranges, for example, and overvoltage range of forty-eight to sixty-five volts or up to three hundred volts and beyond. In some embodiments, the predetermined threshold voltage 25 is selected so that the overvoltage signal 26 achieves the overvoltage state when the power supply voltage 30 reaches about twenty-five volts. In this case, the second transistor 42 can be designed to survive a voltage of about twenty-five volts, while the first transistor 40 can be designed to survive the full overvoltage in the range of at least thirty to fifty volts.

Since the second transistor 42 can be designed to survive only about twenty-five volts rather than the full overvoltage in the range of forty-eight to sixty-five volts, the second transistor 42 can be physically smaller on a silicon die than it would otherwise be. As described above, the smaller size results in lower cost, particularly for embodiments in which the control circuit 34 and the first and second transistors 40, 42, respectively, are integrated onto a common substrate.

Figure 2:
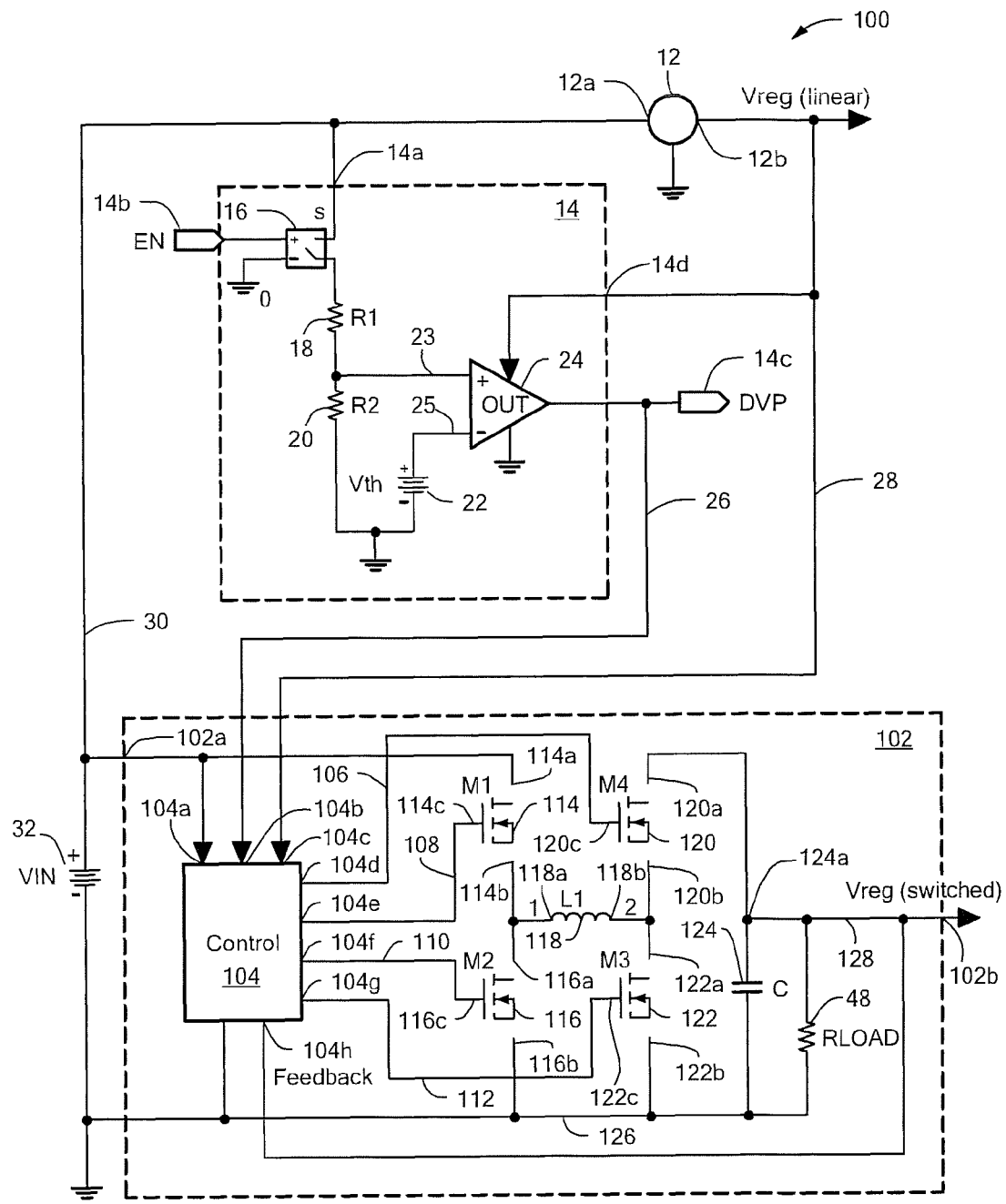
FIG. 2 is block diagram showing another exemplary circuit that combines a buck-boost switching regulator circuit and an overvoltage detection circuit.

Referring to FIG. 2, in which like elements of FIG. 1 are shown having like reference designations, a circuit 100 includes the overvoltage detection circuit 14 and the regulator 12. However, instead of the buck synchronous regulator 50, the circuit 100 includes a buck-boost synchronous regulator 102.

Like the circuit 10 of FIG. 1, the circuit 100 includes a switching regulator circuit 102, here shown to be a synchronous buck-boost switching regulator circuit, coupled to receive the power supply voltage 30 at a node 102a. The switching regulator circuit 102 includes a first transistor 114 having an input node 114a, an output node 114b, and a control node 114c. The input node 114a of the first transistor 114 is coupled to receive the power supply voltage 30 from the power supply 32. The switching regulator circuit 102 also includes a second transistor 116 having an input node 116a, an output node 116b, and a control node 116c. The input node 116a of the second transistor 116 is coupled to the output node 114b of the first transistor 114. The output node 116b of the second transistor 116 is coupled to receive a reference voltage 126. In some embodiments, the reference voltage 126 is zero volts, e.g., ground. The switching regulator circuit 102 also includes a control circuit 104 having a power supply input node 104a coupled to receive the power supply voltage 30, a first output node 104e at which a first control signal 108 is provided, and a second output node 104f at which a second control signal 110 is provided. The first output node 104e of the control circuit 104 is coupled to the control node 114c of the first transistor 114. The second output node 104f of the control circuit 104 is coupled to the control node 116c of the second transistor 116.

The switching regulator circuit 102 further includes an inductor 118 having first and second nodes 118a, 118b, respectively. The first node 118a of the inductor 118 is coupled to the output node 114b of the first transistor 114 and to the input node 116a of the second transistor 116. The switching regulator circuit 102 further includes a third transistor 122 having an input node 122a, an output node 122b, and a control node 122c. The input node 122a of the third transistor 122 is coupled to the second node 118b of the inductor 118, and the output node 122b of the third transistor is coupled to receive the reference voltage 126. The switching regulator circuit 102 further includes a fourth transistor 120 having an input node 120a, an output node 120b, and a control node 120c. The output node 120b of the fourth transistor 120 is coupled to the second node 118b of the inductor 118 and to the input node 122a of the third transistor 122. The switching regulator circuit 102 further includes a capacitor 124 having a node 124a coupled to the input node 120a of the fourth transistor 120. The control circuit 104 further includes a feedback node 104h coupled to the node 124a of the capacitor 124. A regulated voltage 128 (switched-regulated voltage) is provided at the node 124a of the capacitor 124 and at an output node 102b of the switching regulator 102. The control circuit 104 further includes a third output node 104g at which a third control signal 112 is provided and a fourth output node 104d at which a fourth control signal 106 is provided. The third output node 104g of the control circuit 104 is coupled to the control node 116c of the third transistor 116. The fourth output node 104d of the control circuit 104 is coupled to the control node 120c of the fourth transistor 120.

The control circuit 104 is configured to receive the overvoltage signal 26 at a node 104b. The control circuit 104 is configured, in response to the overvoltage signal 26 being in the overvoltage state, to generate the first control signal 108 resulting in the first transistor 114 being in an off condition. When the first transistor 114 is turned off, the switching regulator 102 is essentially shut off, and the regulated output voltage 128 of the switching regulator 102 begins to droop, for example, toward zero volts.

In some embodiments, the control circuit 104 is configured, in response to the overvoltage signal 26 being in the overvoltage state, to generate the first and second control signals 108, 110, respectively, resulting in the first and second transistors 114, 116, respectively, both being in an off condition at the same time. However, in some other embodiments, the control circuit 104 is configured, in response to the overvoltage signal 26 being in the overvoltage state, to generate the first and second control signals 108, 110, respectively, resulting in the first transistor 114 being in an off condition and, at the same time, the second transistor 116 being in an on condition.

In response to the overvoltage signal 26 being in the overvoltage state, the third and forth control signals 106, 112, respectively, can also result in the third and fourth transistors 122, 120, respectively, being either on or off.

In some embodiments, the first, second, third and fourth transistors 114, 116, 122, 120, respectively, are field effect transistors, for example, N-channel FETs. In other embodiments, the first, second, third and fourth transistors 114, 116, 122, 120, respectively, are bipolar transistors, for example, NPN transistors.

In some embodiments, the control circuit 104 is configured, in response to the overvoltage signal 26 not being in the overvoltage state, to generate the first and second control signals 108, 110, respectively, as respective complimentary periodic signals resulting in the first and second transistors 114, 116, respectively, being in respective complimentary periodic on and off conditions. However, in other embodiments, the control circuit 104 is configured, in response to the overvoltage signal 26 not being in the overvoltage state, to generate, during first periodic time periods, the first and second control signals 108, 110, respectively, as respective complimentary signals resulting in the first and second transistors 114, 116, respectively, being in respective complimentary on and off conditions, and to generate, during second periodic time periods, the first and second control signals 108, 110, respectively, resulting in at least one of the first or second transistors 114, 116 respectively, being in the off condition.

In some embodiments, the power supply 32 is nominally about eight to sixteen volts, the power supply voltage 30 is nominally about eight to sixteen volts accordingly, and the power supply voltage 30 has an overvoltage in the range of thirty to fifty volts. However the circuit 100 can be designed for other power supply voltages and other overvoltage ranges, for example, an overvoltage range of forty-eight to sixty-five volts or up to three hundred volts and beyond.

In some embodiments, the predetermined threshold voltage 25 is selected so that the overvoltage signal 26 achieves the overvoltage state when the power supply voltage 30 reaches about twenty-five volts. In this case, the second transistor 116 can be designed to survive a voltage of about twenty-five volts, while the first transistor 114 can be designed to survive the full overvoltage in the range of at least thirty to fifty volts. In addition, the third and fourth transistors 122, 120, respectively, can also be designed to survive a voltage of about twenty-five volts.

Since the second, third, and fourth transistors 116, 122, 120, respectively, can be designed to survive only about twenty-five volts rather than the full overvoltage in the range of forty-eight to sixty-five volts, the second, third, and fourth transistors 116, 122, 120, respectively, can be physically smaller on a silicon die than otherwise would be required. As described above, the smaller size results in lower cost, particularly for embodiments in which the control circuit 104 and the first, second, third, and fourth transistors 114, 116, 122, 120, respectively are integrated onto a common substrate.

While particular values of the power supply voltage 30 and overvoltage conditions are described herein, it will be recognized that the circuit can be designed to accommodate other power supply voltages and other overvoltage conditions. Also, while it is described above that the predetermined threshold voltage 25 is selected so that the overvoltage signal 26 achieves the overvoltage state when the power supply voltage 30 reaches about twenty-five volts, the predetermined threshold voltage 25 can be selected so that the overvoltage signal 26 achieves the overvoltage state when the power supply voltage 30 reaches a voltage higher or lower than twenty-five volts.

All references cited herein are hereby incorporated herein by reference in their entirety.

Having described preferred embodiments of the invention, it will now become apparent to one of ordinary skill in the art that other embodiments incorporating their concepts may be used. It is felt therefore that these embodiments should not be limited to disclosed embodiments, but rather should be limited only by the spirit and scope of the appended claims.

What is claimed is:

1. An electronic circuit, comprising:
a switching regulator circuit, comprising:
a first transistor having an input node, an output node, and a control node, wherein the input node of the first transistor is coupled to receive a power supply voltage;
a second transistor having an input node, an output node, and a control node, wherein the input node of the second transistor is coupled to the output node of the first transistor, wherein the output node of the second transistor is coupled to receive a reference voltage; and
a control circuit having a first output node at which a first control signal is provided and a second output node at which a second control signal is provided, wherein the first output node of the control circuit is coupled to the control node of the first transistor, and wherein the second output node of the control circuit is coupled to the control node of the second transistor; and
an overvoltage detection circuit having an input node coupled to receive the power supply voltage and an output node at which an overvoltage signal is provided capable of an overvoltage state indicative of the power supply voltage being above a predetermined threshold voltage, wherein the control circuit is coupled to receive the overvoltage signal, and wherein the control circuit is configured, in response to the overvoltage signal being in the overvoltage state, to generate the first control signal resulting in the first transistor being in an off condition.

2. The electronic circuit of claim 1, wherein the control circuit is configured, in response to the overvoltage signal being in the overvoltage state, to generate the first and second control signals resulting in the first and second transistors both being in an off condition at the same time.

3. The electronic circuit of claim 1, wherein the control circuit is configured, in response to the overvoltage signal being in the overvoltage state, to generate the first and second control signals resulting in the first transistor being in an off condition and, at the same time, the second transistor being in an on condition.

4. The electronic circuit of claim 1, wherein the first and second transistors are field effect transistors.

5. The electronic circuit of claim 1, wherein the control circuit is configured, in response to the overvoltage signal not being in the overvoltage state, to generate the first and second control signals as respective complimentary periodic signals resulting in the first and second transistors being in respective complimentary periodic on and off conditions.

6. The electronic circuit of claim 1, wherein the control circuit is configured, in response to the overvoltage signal not being in the overvoltage state, to generate, during first periodic time periods, the first and second control signals as respective complimentary signals resulting in the first and second transistors being in respective complimentary on and off conditions, and to generate, during second periodic time periods, the first and second control signals resulting in at least one of the first or second transistors being in the off condition.

7. The electronic circuit of claim 1, further comprising a voltage regulator circuit having an input node coupled to receive the power supply voltage and configured to generate a regulated voltage at an output node regardless of any state of the overvoltage signal.

8. The electronic circuit of claim 7, wherein the control circuit further comprises a power input node coupled to receive the regulated voltage.

9. The electronic circuit of claim 7, wherein the overvoltage detection circuit further comprises a power input node configured to receive the regulated voltage.

10. The electronic circuit of claim 1, wherein the switching regulator circuit further comprises:
   an inductor having first and second nodes, the first node of the inductor coupled to the output node of the first transistor and to the input node of the second transistor; and
   a capacitor coupled to the second node of the inductor, wherein the control circuit further comprises a feedback node coupled to the second node of the inductor, and wherein a switched-regulated voltage is provided at the second node of the inductor.

11. The electronic circuit of claim 1, wherein the switching regulator circuit further comprises:
   an inductor having first and second nodes, the first node of the inductor coupled to the output node of the first transistor and to the input node of the second transistor;
   a third transistor having an input node, an output node, and a control node, wherein the input node of the third transistor is coupled to the second node of the inductor and wherein the output node of the third transistor is coupled to receive the reference voltage;
   a fourth transistor having an input node, an output node, and a control node, wherein the output node of the fourth transistor is coupled to the second node of the inductor and to the input node of the third transistor; and
   a capacitor having a node coupled to the input node of the fourth transistor, wherein the control circuit further comprises a feedback node coupled to the node of the capacitor, and wherein a regulated voltage is provided at the node of the capacitor, wherein the control circuit further has a third output node at which a third control signal is provided and a fourth output node at which a fourth control signal is provided, wherein the third output node of the control circuit is coupled to the control node of the third transistor, and wherein the fourth output node of the control circuit is coupled to the control node of the fourth transistor.

12. The electronic circuit of claim 1, wherein the overvoltage detection circuit further comprises an enable input node coupled to receive an enable signal, wherein the overvoltage detection circuit is configured to generate the overvoltage signal not in the overvoltage state in response to a state of the enable signal.

13. A method of controlling a switching regulator circuit, the switching regulator circuit comprising:
   a first transistor having an input node, an output node, and a control node, wherein the input node of the first transistor is coupled to receive a power supply voltage;
   a second transistor having an input node, an output node, and a control node, wherein the input node of the second transistor is coupled to the output node of the first transistor, wherein the output node of the second transistor is coupled to receive a reference voltage; and
   a control circuit having a first output node at which a first control signal is provided and a second output node at which a second control signal is provided, wherein the first output node of the control circuit is coupled to the control node of the first transistor and wherein the second output node of the control circuit is coupled to the control node of the second transistor, the method comprising:
   detecting if the power supply voltage is above a predetermined threshold voltage; and
   in response to the detecting, turning off the first transistor.

14. The method of claim 13, wherein the turning off the first transistor comprises turning off the first and second transistors at the substantially same time.

15. The method of claim 13, wherein the turning off the first transistor comprises turning off the first transistor and turning on the second transistor at substantially the same time.

16. The method of claim 13, further comprising:
   generating a regulated voltage regardless of the turning off the first transistor.

17. The method of claim 16, wherein the control circuit further comprises a power input node coupled to receive the regulated voltage.

18. The method of claim 16, wherein the detecting comprises detecting by use of the regulated voltage regardless of the turning off the first transistor.

19. The method of claim 13, wherein the switching regulator circuit further comprises:
   an inductor having first and second nodes, the first node coupled to the output node of the first transistor and to the input node of the second transistor; and
   a capacitor coupled to the second node of the inductor, wherein the control circuit further comprises a feedback node coupled to the second node of the inductor, and wherein a switched-regulated voltage is provided at the second node of the inductor.

20. The method of claim 13, wherein the switching regulator circuit further comprises:
   an inductor having first and second nodes, the first node of the inductor coupled to the output node of the first transistor and to the input node of the second transistor;
   a third transistor having an input node, an output node, and a control node, wherein the input node of the third transistor is coupled to the second node of the inductor and wherein the output node of the third transistor is coupled to receive the reference voltage;
   a fourth transistor having an input node, an output node, and a control node, wherein the output node of the fourth transistor is coupled to the second node of the inductor and to the input node of the third transistor; and
   a capacitor having a node coupled to the input node of the fourth transistor, wherein the control circuit further comprises a feedback node coupled to the node of the capacitor, and wherein a regulated voltage is provided at the node of the capacitor, wherein the control circuit further has a third output node at which a third control signal is provided and a fourth output node at which a fourth control signal is provided, wherein the third output node of the control circuit is coupled to the control node of the third transistor, and wherein the fourth output node of the control circuit is coupled to the control node of the fourth transistor.

* * * * *

UNITED STATES PATENT AND TRADEMARK OFFICE
CERTIFICATE OF CORRECTION

PATENT NO. : 7,834,603 B2  
APPLICATION NO. : 12/124752  
DATED : November 16, 2010  
INVENTOR(S) : Vijay Mangtani et al.

It is certified that error appears in the above-identified patent and that said Letters Patent is hereby corrected as shown below:

Column 1, Line 34 delete "to a" and replace with --to as a--.

Column 1, Line 42 delete "to a" and replace with --to as a--.

Signed and Sealed this
Twenty-second Day of February, 2011

David J. Kappos
*Director of the United States Patent and Trademark Office*